US012711388B2

(12) United States Patent
Aytar et al.

(10) Patent No.: US 12,711,388 B2
(45) Date of Patent: Aug. 18, 2026

(54) ALIGNING SEQUENCES BY GENERATING ENCODED REPRESENTATIONS OF DATA ITEMS

(71) Applicant: GDM Holding LLC, Mountain View, CA (US)

(72) Inventors: Yusuf Aytar, London (GB); Debidatta Dwibedi, Sunnyvale, CA (US); Andrew Zisserman, London (GB); Jonathan Tompson, Mountain View, CA (US); Pierre Sermanet, Palo Alto, CA (US)

(73) Assignee: GDM Holding LLC, Mountain View, CA (US)

( * ) Notice: Subject to any disclaimer, the term of this patent is extended or adjusted under 35 U.S.C. 154(b) by 627 days.

(21) Appl. No.: 17/295,286

(22) PCT Filed: Nov. 21, 2019

(86) PCT No.: PCT/EP2019/082086
§ 371 (c)(1),
(2) Date: May 19, 2021

(87) PCT Pub. No.: WO2020/104590
PCT Pub. Date: May 28, 2020

(65) Prior Publication Data

US 2022/0004883 A1 Jan. 6, 2022

Related U.S. Application Data

(60) Provisional application No. 62/770,595, filed on Nov. 21, 2018.

(51) Int. Cl.
*G06K 9/00* (2022.01)
*G06F 18/214* (2023.01)
(Continued)

(52) U.S. Cl.
CPC .......... *G06N 3/088* (2013.01); *G06F 18/214* (2023.01); *G06F 18/24147* (2023.01);
(Continued)

(58) Field of Classification Search
CPC .... G06T 7/30; G06T 7/32; G06T 7/33; G06T 7/337; G06T 7/344; G06T 7/35;
(Continued)

(56) References Cited

U.S. PATENT DOCUMENTS

| | | | | |
|---|---|---|---|---|
| 10,726,313 | B2 * | 7/2020 | Lee | G06V 20/41 |
| 10,766,137 | B1 * | 9/2020 | Porter | G06N 3/045 |

(Continued)

FOREIGN PATENT DOCUMENTS

| | | |
|---|---|---|
| CN | 108182657 | 6/2018 |

OTHER PUBLICATIONS

Abadi et al., "Tensorflow: A system for large-scale machine learning," 12th {USENIX} Symposium on Operating Systems Design and Implementation, Savannah, GA, USA, Nov. 2-4, 2016, Nov. 2016, 21 pages.

(Continued)

*Primary Examiner* — Eric Rush
(74) *Attorney, Agent, or Firm* — Fish & Richardson P.C.

(57) ABSTRACT

An encoder neural network is described which can encode a data item, such as a frame of a video, to form a respective encoded data item. Data items of a first data sequence are associated with respective data items of a second sequence, by determining which of the encoded data items of the second sequence is closest to the encoded data item produced from each data item of the first sequence. Thus, the two data sequences are aligned. The encoder neural network is trained automatically using a training set of data sequences, by an iterative process of successively increasing cycle consistency between pairs of the data sequences.

10 Claims, 6 Drawing Sheets

(51) Int. Cl.

| | |
|---|---|
| ***G06F 18/2413*** | (2023.01) |
| ***G06F 18/2431*** | (2023.01) |
| ***G06N 3/0455*** | (2023.01) |
| ***G06N 3/088*** | (2023.01) |
| ***G06T 7/00*** | (2017.01) |
| ***G06V 10/74*** | (2022.01) |
| ***G06V 10/82*** | (2022.01) |
| ***G06V 20/40*** | (2022.01) |

(52) U.S. Cl.

CPC ....... *G06F 18/2431* (2023.01); *G06N 3/0455* (2023.01); *G06T 7/97* (2017.01); *G06V 10/74* (2022.01); *G06V 10/761* (2022.01); *G06V 10/82* (2022.01); *G06V 20/41* (2022.01); *G06V 20/44* (2022.01); *G06V 20/48* (2022.01); *G06T 2207/10016* (2013.01); *G06T 2207/20081* (2013.01); *G06T 2207/20084* (2013.01)

(58) Field of Classification Search

CPC .... G06T 7/37; G06T 7/38; G06T 7/97; G06T 2207/10016; G06T 2207/20081; G06T 2207/20084; G06V 10/00; G06V 10/40; G06V 10/467; G06V 10/70; G06V 10/74; G06V 10/75; G06V 10/751; G06V 10/7515; G06V 10/753; G06V 10/761; G06V 10/764; G06V 10/77; G06V 10/771; G06V 10/7715; G06V 10/82; G06V 20/40; G06V 20/41; G06V 20/44; G06V 20/46; G06V 20/48; G06V 20/49; G06V 20/70; G06F 18/213; G06F 18/214; G06F 18/2148; G06F 18/22; G06F 18/24; G06F 18/2413; G06F 18/24147; G06F 18/2431; G06F 18/26; G10L 25/30; G10L 25/48; G10L 25/51; G10L 25/54; G10L 25/57; G06N 3/006; G06N 3/02; G06N 3/044; G06N 3/0442; G06N 3/045; G06N 3/0455; G06N 3/049; G06N 3/084; G06N 3/088; G06N 3/09; G11B 27/031; G11B 27/10; G11B 27/102

USPC ................ 382/100, 155–160, 181, 190, 209, 382/216–219, 224–229, 276, 305, 325; 706/15, 18, 20, 21, 25, 26, 27, 30

See application file for complete search history.

(56) References Cited

U.S. PATENT DOCUMENTS

| | | | | |
|---|---|---|---|---|
| 11,630,996 | B1 * | 4/2023 | O'Shea ................ | G06N 3/0455 706/25 |
| 2014/0333775 | A1 * | 11/2014 | Naikal ................... | G06V 20/40 348/159 |
| 2017/0103264 | A1 * | 4/2017 | Javan Roshtkhari .. | G06V 20/49 |
| 2017/0178345 | A1 | 6/2017 | Pham | |
| 2017/0308787 | A1 * | 10/2017 | Corrado ................. | G06N 3/063 |
| 2018/0129974 | A1 * | 5/2018 | Giering .................... | G06N 3/08 |
| 2018/0247201 | A1 | 8/2018 | Liu et al. | |
| 2018/0308522 | A1 * | 10/2018 | Ramey ............... | H04N 21/4882 |
| 2019/0297392 | A1 * | 9/2019 | Farre Guiu ............ | G06V 20/48 |
| 2020/0149998 | A1 * | 5/2020 | Ayyagari ............... | G06N 3/088 |

OTHER PUBLICATIONS

Alayrac et al., "Learning from narrated instruction videos," IEEE Transactions on Pattern Analysis and Machine Intelligence, Sep. 2017, 40(9):1-14.

Anderson et al., "An introduction to multivariate statistical analysis," Wiley, New York, Dec. 1958, 7 pages.

Andrew et al., "Deep canonical correlation analysis," International Conference on Machine Learning, Atlanta, GA, USA, Jun. 16-21, 2013, May 2013, 9 pages.

Arandjelovic et al., "Look, listen and learn," Proceedings of the IEEE International Conference on Computer Vision, Venice, Italy, Oct. 22-29, 2017, 2017, 9 pages.

Assael et al., "Lipnet: End-to-end sentence-level lipreading," arXiv, Nov. 2016, 13 pages.

Aytar et al., "Playing hard exploration games by watching youtube," arXiv, May 2018, 15 pages.

Aytar et al., "See, hear, and read: Deep aligned representations," arXiv, Jun. 2017, 9 pages.

Aytar et al., "Soundnet: Learning sound representations from unlabeled video," Advances in Neural Information Processing Systems, Oct. 2016, 29:1-9.

Bahdanau et al., "Neural machine translation by jointly learning to align and translate," arXiv, Sep. 2014, 15 pages.

Becattini et al., "Am I done? Predicting action progress in videos," ACM Transactions on Multimedia Computing, Communications, and Applications (TOMM), Dec. 2020, 16(4):1-21.

Bojanowski et al., "Weakly supervised action labeling in videos under ordering constraints," European Conference on Computer Vision, Zurich, Switzerland, Sep. 6-12, 2014, Sep. 2014, 16 pages.

Carreira et al., "Quo vadis, action recognition? a new model and the kinetics dataset," Proceedings of the IEEE Conference on Computer Vision and Pattern Recognition, Honolulu, Hawaii, USA, Jul. 21-26, 2017, 2017, 10 pages.

Chatfield et al., "Return of the devil in the details: Delving deep into convolutional nets," arXiv, May 2014, 11 pages.

Damen et al., "Scaling egocentric vision: The epic-kitchens dataset," Proceedings of the European Conference on Computer Vision (ECCV), Munich, Germany, Sep. 8-14, 2018, 2018, 17 pages.

Del Pero et al., "Articulated motion discovery using pairs of trajectories," Proceedings of the IEEE Conference on Computer Vision and Pattern Recognition, Boston, MA, USA, Jun. 7-12, 2015, 2015, 10 pages.

Doersch et al., "Multi-task self-supervised visual learning," Proceedings of the IEEE International Conference on Computer Vision, Venice, Italy, Oct. 22-29, 2017, 2017, 10 pages.

Doersch et al., "Unsupervised visual representation learning by context prediction," Proceedings of the IEEE International Conference on Computer Vision, Santiago, Chile, Dec. 7-13, 2015, 2015, 9 pages.

Fang et al., "High-quality nonparallel voice conversion based on cycle-consistent adversarial network," 2018 IEEE International Conference on Acoustics, Speech and Signal Processing (ICASSP), Calgary, Alberta, Canada, Apr. 15-20, 2018, Apr. 2018, 5 pages.

Fernando et al., "Self-supervised video representation learning with odd-one-out networks," Proceedings of the 2017 IEEE Conference on Computer Vision and Pattern Recognition, Honolulu, Hawaii, USA, Jul. 21-26, 2017, 2017, 10 pages.

Girdhar et al., "Actionvlad: Learning spatio-temporal aggregation for action classification," Proceedings of the 2017 IEEE Conference on Computer Vision and Pattern Recognition, Honolulu, Hawaii, USA, Jul. 21-26, 2017, Apr. 2017, 14 pages.

Goldberger et al., "Neighborhood components analysis," Advances in Neural Information Processing Systems, 2004, 17:1-8.

Graves et al., "Connectionist temporal classification: labelling unsegmented sequence data with recurrent neural networks," Proceedings of the 23rd International Conference on Machine Learning, Pittsburgh, Pennsylvania, Jun. 25-29, 2006, Jun. 2006, 8 pages.

He et al., "Deep residual learning for image recognition," Proceedings of the IEEE Conference on Computer Vision and Pattern Recognition, Las Vegas, Nevada, USA, Jun. 26-Jul. 1, 2016, 2016, 9 pages.

Heidarivincheh et al., "Action completion: A temporal model for moment detection," arXiv, May 2018, 15 pages.

Hoffman et al., "Cycada: Cycle-consistent adversarial domain adaptation," International Conference on Machine Learning 2018, Stockholmsmässan, Stockholm, Sweden, Jul. 2018, 10 pages.

Hori et al., "Cycle-consistency training for end-to-end speech recognition," ICASSP 2019-2019 IEEE International Conference

(56) References Cited

OTHER PUBLICATIONS on Acoustics, Speech and Signal Processing (ICASSP), Brighton, United Kingdom, May 12-17, 2019, May 2019, 5 pages.
Hyvarinen et al., "Unsupervised feature extraction by time-contrastive learning and nonlinear ica," Advances in Neural Information Processing Systems, May 2016, 29:1-11.
Krizhevsky et al., "Imagenet classification with deep convolutional neural networks," Advances in Neural Information Processing Systems, 2012, 25:1-9.
Lan et al., "Action recognition by hierarchical mid-level action elements," Proceedings of the 2015 IEEE International Conference on Computer Vision, Santiago, Chile, Dec. 7-13, 2015, 2015, 9 pages.
Lea et al., "Segmental spatiotemporal cnns for fine-grained action segmentation," European Conference on Computer Vision, Amsterdam, Netherlands, Oct. 8-16, 2016, Oct. 2016, 17 pages.
Ma et al., "Learning activity progression in lstms for activity detection and early detection," Proceedings of the 2016 IEEE Conference on Computer Vision and Pattern Recognition, Las Vegas, Nevada, USA, Jun. 27-30, 2016, 2016, 9 pages.
Misra et al., "Shuffle and learn: unsupervised learning using temporal order verification," European Conference on Computer Vision, Amsterdam, Netherlands, Oct. 8-16, 2016, Oct. 2016, 21 pages.
Movshovitz-Attias et al., "No fuss distance metric learning using proxies," Proceedings of the 2017 IEEE International Conference on Computer Vision, Venice, Italy, Oct. 22-29, 2017, 2017, 9 pages.
Owens et al., "Ambient sound provides supervision for visual learning," European Conference on Computer Vision, Amsterdam, Netherlands, Oct. 8-16, 2016, Oct. 2016, 20 pages.
PCT International Preliminary Report on Patentability in International Appln. No. PCT/EP2019/082086, dated Jun. 3, 2021, 12 pages.
PCT International Search Report and Written Opinion in International Appln. No. PCT/EP2019/082086, dated Jun. 22, 2020, 21 pages.
Pirsiavash et al., "Parsing videos of actions with segmental grammars," Proceedings of the 2014 IEEE Conference on Computer Vision and Pattern Recognition, Columbus, Ohio, USA, Jun. 24-27, 2014, 2014, 8 pages.
Revaud et al., "Event retrieval in large video collections with circulant temporal encoding," Proceedings of the 2013 IEEE Conference on Computer Vision and Pattern Recognition, Washington, DC, USA, Jun. 23-28, 2013, 2013, 8 pages.
Rocco et al., "Neighborhood consensus networks," arXiv, Oct. 2018, 20 pages.
Sanakoyeu et al., "Deep unsupervised learning of visual similarities," Pattern Recognition, Jun. 2018, 78:1-12.
Santa Cruz et al., "DeepPermNet: Visual permutation learning," Proceedings of the 2017 IEEE Conference on Computer Vision and Pattern Recognition, Honolulu, Hawaii, USA, Jul. 21-27, 2017, 2017, 9 pages.
Sener et al., "Unsupervised learning and segmentation of complex activities from video," Proceedings of the 2018 IEEE Conference on Computer Vision and Pattern Recognition, Salt Lake City, Utah, USA, Jun. 18-22, 2018, 9 pages.
Sener et al., "Unsupervised semantic parsing of video collections," Proceedings of the 2015 IEEE International Conference on Computer Vision, Santiago, Chile, Dec. 7-13, 2015, 2015, 9 pages.
Sermanet et al., "Time-contrastive networks: Self-supervised learning from video," 2018 IEEE International Conference on Robotics and Automation (ICRA), Brisbane, Australia, May 21-25, 2018, May 2018, 15 pages.
Shechtman et al., "Matching local self-similarities across images and videos," 2007 IEEE Conference on Computer Vision and Pattern Recognition, Minneapolis, Minnesota, USA, Jun. 18-23, 2007, Jun. 2007, 8 pages.
Sigurdsson et al., "Actor and observer: Joint modeling of first and third-person videos," Proceedings of the 2018 IEEE Conference on Computer Vision and Pattern Recognition, Salt Lake City, Utah, USA, Jun. 18-22, 2018, 2018, 9 pages.
Sigurdsson et al., "Asynchronous temporal fields for action recognition," Proceedings of the 2017 IEEE Conference on Computer Vision and Pattern Recognition, Honolulu, Hawaii, USA, Jul. 21-27, 2017, 2017, 10 pages.
Simonyan et al., "Very deep convolutional networks for large-scale image recognition," arXiv, Sep. 2014, 14 pages.
Snell et al., "Prototypical networks for few-shot learning," arXiv, Mar. 2017, 13 pages.
Sohn et al., "Improved deep metric learning with multi-class n-pair loss objective," Proceedings of the 30th International Conference on Neural Information Processing Systems, Barcelona, Spain, Dec. 5, 2016, Dec. 2016, 9 pages.
Soltau et al., "Neural speech recognizer: Acoustic-to-word LSTM model for large vocabulary speech recognition," arXiv, Oct. 2016, 6 pages.
Soomro et al., "UCF101: A dataset of 101 human actions classes from videos in the wild," arXiv, Dec. 2012, 7 pages.
Sutskever et al., "Sequence to sequence learning with neural networks," Advances in Neural Information Processing Systems, Sep. 2014, 9 pages.
Wang et al., "Action recognition with improved trajectories," Proceedings of the 2013 IEEE International Conference on Computer Vision, Sydney, Australia, Dec. 1-8, 2013, 2013, 8 pages.
Wang et al., "Image co-segmentation via consistent functional maps," Proceedings of the 2013 IEEE International Conference on Computer Vision, Sydney, Australia, Dec. 1-8, 2013, 2013, 8 pages.
Wang et al., "Temporal segment networks: Towards good practices for deep action recognition," European Conference on Computer Vision, European Conference on Computer Vision, Amsterdam, Netherlands, Oct. 8-16, 2016, Oct. 2016, 16 pages.
Wang et al., "Unsupervised multi-class joint image segmentation," Proceedings of the 2014 IEEE Conference on Computer Vision and Pattern Recognition, Columbus, Ohio, USA, Jun. 24-27, 2014, 2014, 8 pages.
Wikipedia.com [online], "Coefficient of determination," Apr. 2020, retrieved on May 26, 2021, retrieved from URL<https://en.wikipedia.org/wiki/Coefficient_of_determination>, 13 pages.
Wikipedia.com [online], "Kendall rank correlation coefficient," Nov. 2016, retrieved on May 26, 2021, retrieved from URL<https://en.wikipedia.org/wiki/Kendall_rank_correlation_coefficient>, 8 pages.
Wilson et al., "Network principles for sfm: Disambiguating repeated structures with local context," Proceedings of the 2013 IEEE International Conference on Computer Vision, Australia, Dec. 1-8, 2013, 2013, 8 pages.
Yeung et al., "Every moment counts: Dense detailed labeling of actions in complex videos," International Journal of Computer Vision, Apr. 2018, 15 pages.
Zach et al., "Disambiguating visual relations using loop constraints," 2010 IEEE Computer Society Conference on Computer Vision and Pattern Recognition, San Francisco, California, Jun. 13-18, 2010, Jun. 2010, 9 pages.
Zhang et al., "From actemes to action: A strongly-supervised representation for detailed action understanding," Proceedings of the 2013 IEEE International Conference on Computer Vision, Australia, Dec. 1-8, 2013, 2013, 8 pages.
Zhao et al., "Temporal action detection with structured segment networks," Proceedings of the 2017 IEEE International Conference on Computer Vision, Venice, Italy, Oct. 22-29, 2017, 2017, 10 pages.
Zhou et al., "Flowweb: Joint image set alignment by weaving consistent, pixel-wise correspondences," Proceedings of the 2015 IEEE Conference on Computer Vision and Pattern Recognition, Boston, MA, USA, Jun. 7-12, 2015, 2015, 10 pages.
Zhou et al., "Learning dense correspondence via 3d-guided cycle consistency," Proceedings of the 2016 IEEE Conference on Computer Vision and Pattern Recognition, Las Vegas, Nevada, USA, Jun. 26-Jul. 1, 2016, 2016, 10 pages.
Zhou et al., "Multi-image matching via fast alternating minimization," Proceedings of the 2015 IEEE International Conference on Computer Vision, Santiago, Chile, Dec. 7-13, 2015, 2015, 9 pages.

(56) References Cited

OTHER PUBLICATIONS

Zhu et al., "Unpaired image-to-image translation using cycle-consistent adversarial networks," Proceedings of the 2017 IEEE International Conference on Computer Vision, Venice, Italy, Oct. 22-29, 2017, 2017, 10 pages.
Office Action in Chinese Appln. No. 201980075332.7, dated Jul. 8, 2024, 22 pages (with English translation).
Office Action in European Appln. No. 19817969.9, dated Jun. 25, 2024, 10 pages.
He et al., "Unpaired image-to-image conversion based on improved CycleGAN model Journal of Yulin Normal University," Journal of Yulin Normal University, 2018, 39(2):122-126 (with machine translation).
Office Action in Chinese Appln. No. 201980075332.7, dated Dec. 27, 2023, 35 pages (with English translation).
Office Action in European Appln. No. 19817969.9, dated Feb. 6, 2024, 12 pages.
Vo et al., "Self-supervised Multi-view Person Association and Its Applications," CoRR, arXiv:1805.08717v3, Apr. 18, 2020, 14 pages.
Brief Communication in European Appln. No. 19817969.9, dated Nov. 19, 2024, 10 pages.
Extended Search Report in European Appln. No. 25178660.4, mailed on Jun. 16, 2025, 16 pages.
Vo et al., "Automatic adaptation of person association for multiview tracking in group activities," IEEE Transactions on Pattern Analysis and Machine Intelligence, Aug. 1, 2021, 43(8):2794-2808.

* cited by examiner

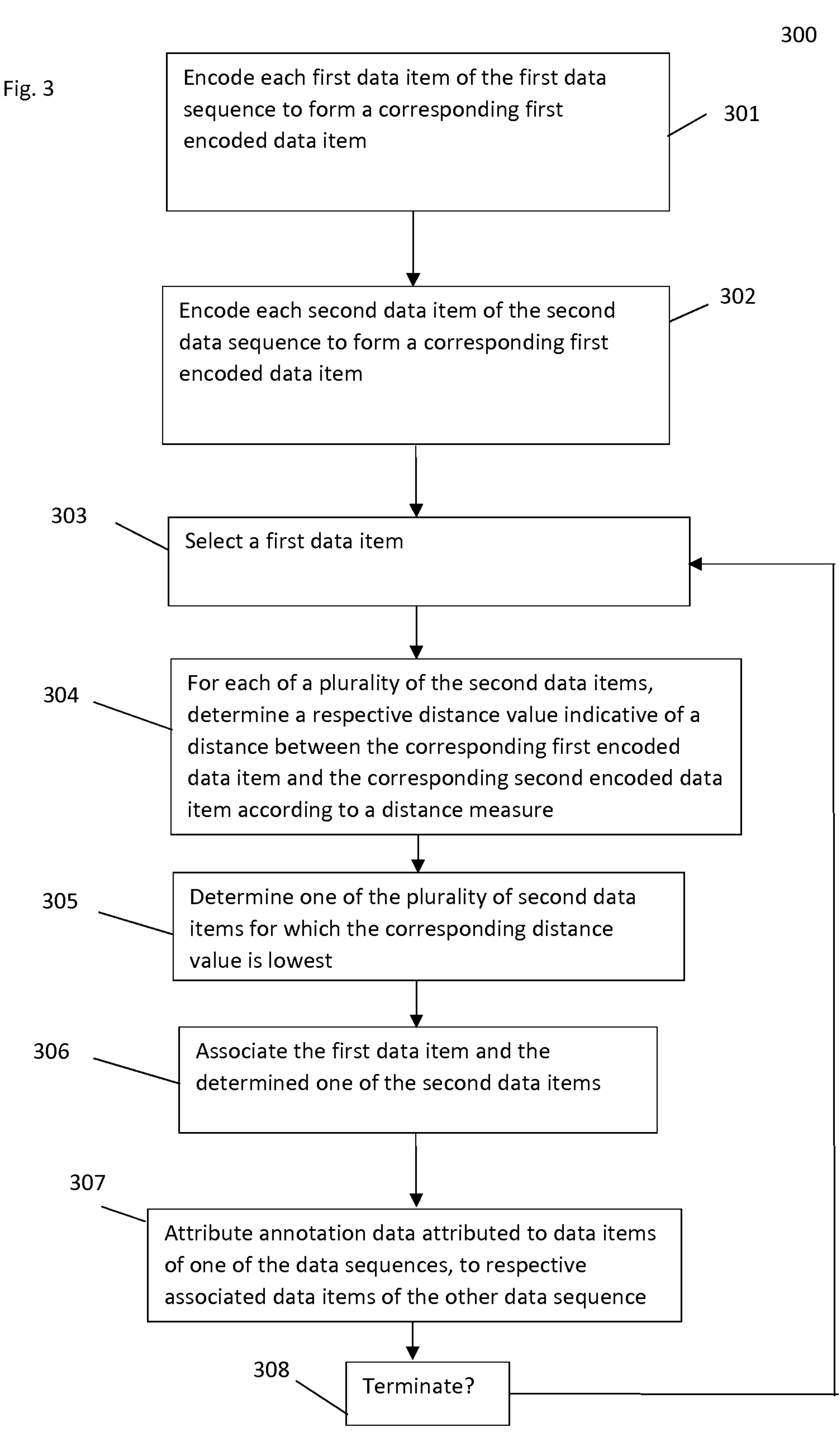
300
Fig. 3
Encode each first data item of the first data sequence to form a corresponding first encoded data item
301
Encode each second data item of the second data sequence to form a corresponding first encoded data item
302
303
Select a first data item
304
For each of a plurality of the second data items, determine a respective distance value indicative of a distance between the corresponding first encoded data item and the corresponding second encoded data item according to a distance measure
305
Determine one of the plurality of second data items for which the corresponding distance value is lowest
306
Associate the first data item and the determined one of the second data items
307
Attribute annotation data attributed to data items of one of the data sequences, to respective associated data items of the other data sequence
308
Terminate?

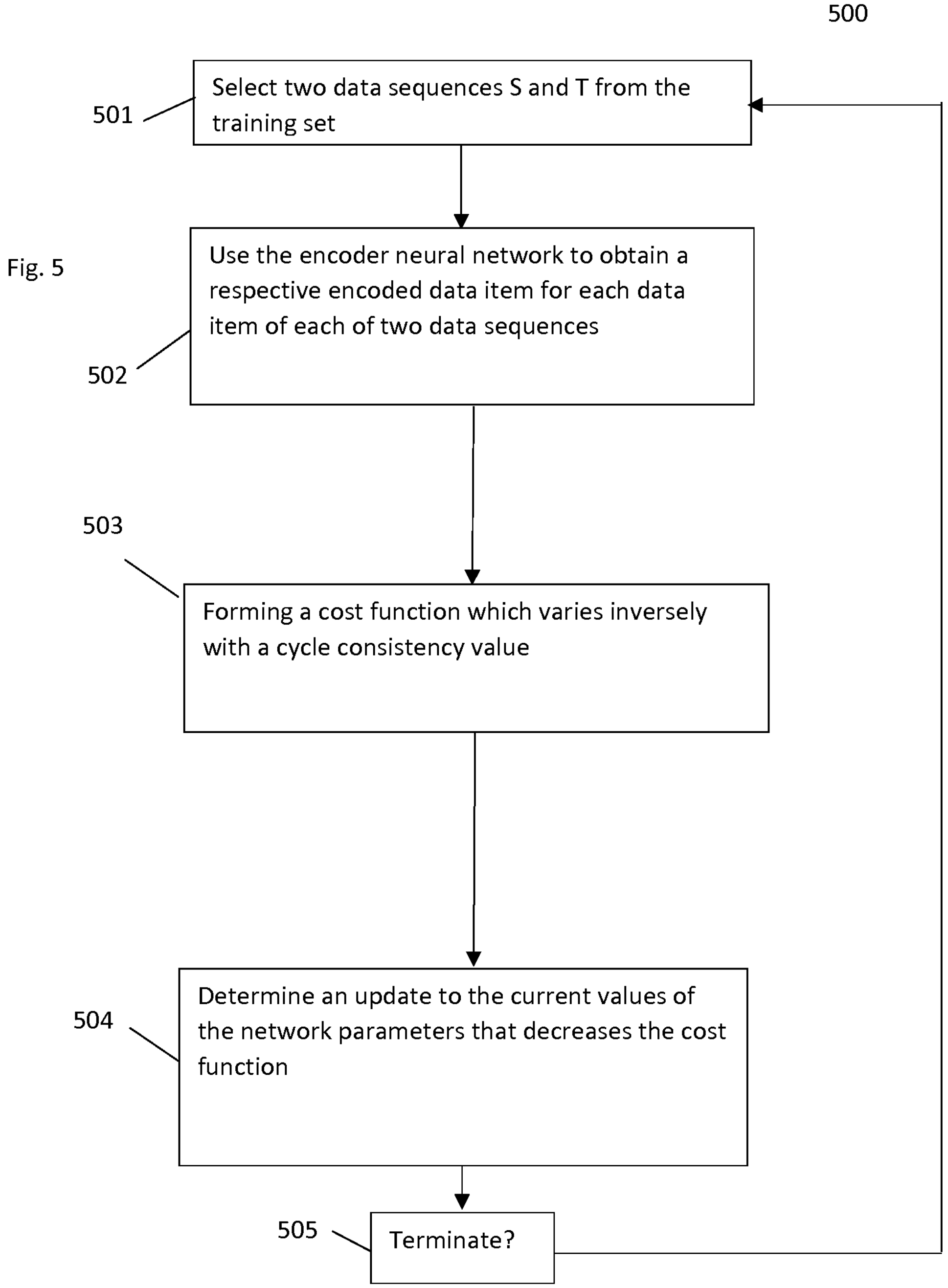
500
501
Select two data sequences S and T from the training set
Fig. 5
Use the encoder neural network to obtain a respective encoded data item for each data item of each of two data sequences
502
503
Forming a cost function which varies inversely with a cycle consistency value
504
Determine an update to the current values of the network parameters that decreases the cost function
505
Terminate?

ALIGNING SEQUENCES BY GENERATING ENCODED REPRESENTATIONS OF DATA ITEMS

CROSS-REFERENCE TO RELATED APPLICATION

This application is a National Stage Application under 35 U.S.C. § 371 and claims the benefit of International Application No. PCT/EP2019/082086, filed Nov. 21, 2019, which claims priority to U.S. Application No. 62/770,595, filed Nov. 21, 2018, entitled REPRESENTATION LEARNING FOR SEQUENCE ALIGNMENT, the disclosure of which is incorporated herein by reference.

BACKGROUND

This specification relates to methods and systems for training an encoder neural network to encode data items (e.g. video frames) to produce respective encoded data items. It further relates to using the encoder neural network for purposes such as aligning sequences of data items, searching a set of multiple data items, annotating data items and classifying a data item into one of a number of classes.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system, which may be implemented as one or more computer programs on one or more computers in one or more locations, and a method performed by the system.

In a first aspect, an encoder neural network is described which can encode a data item which is one of a sequence of data items (a "data sequence"), to form a respective encoded data item. One or more data items of a first data sequence can be aligned with (i.e. associated with) respective data items of a second sequence (e.g. by creating a database of metadata linking the associated data items), by determining, for each of the data item(s) of the first sequence, which of the encoded data items of the second sequence is closest to the encoded data item produced from that data item of the first sequence.

Here "closest" is defined as having the lowest distance value, where the "distance value" is defined according to a distance measure such as Euclidean distance (i.e., the distance value for two encoded data items is the square root of the sum over the components of one of the encoded data items of the square of the difference between that component of the encoded data item and the corresponding component of the other encoded data item). In other forms of the method another distance measure may be used, such as Manhattan distance.

In a preferred case, the data items of each data sequence may describe respective events in an environment at respective successive times. This may be different environments for different respective data sequences, or the data sequences may alternatively describe different respective periods in a single environment, e.g., when different people are present in the environment. The association of data items in the respective data sequences thus associates events in the respective data sequences. In particular, the encoder neural network can be used to associate events of the respective data sequences which have the same significance (i.e., events of a single type). The encoder network can be trained using a plurality (e.g., a large number of) data sequences which each describe environments during respective periods in which an event of at least one given type occurred. The encoder neural network is thereby trained to recognize that events of this type are significant, and to recognize events of this type in a new data sequence.

The environments may be real or simulated. For example, at least one of the data sequences may be composed of data items which are real world data (i.e., describing a real-world environment) captured by one or more sensors (e.g. cameras), at a corresponding sequence of successive times when the events occurred.

For example, the data items may be images (e.g., video frames) captured by a camera showing human and/or non-human participants moving within the environment, and the data sequences in this case may be video sequences. The events may in this case comprise the positions and/or movements of the participants in the corresponding environment. In another example, the data items may (additionally or alternatively) comprise sound data captured by microphone(s), and the events in this case may be the speaking of specific words.

The respective numbers of data items in the data sequences may be different (e.g. there are more first data items than second data items, or vice versa). Alternatively or additionally, events of one of the types may occur with different timing in each of the respective sequences. For example, a participant in the environment may perform an action of a certain type near the start of a period described by one data sequence, and later in a period described by another data sequence.

Following the alignment of the data sequences, annotation data (e.g., a text label or another data file, such as a portion of audio data) which is associated with data items of one of the sequences may be associated with the corresponding aligned data items of the other of the data sequences. This provides a computationally efficient way of generating annotation data for the other of the data sequences, without requiring human interaction.

One example of this process would be an automatic annotation of video data. In this case the annotation data might comprise text and/or images which may be presented to a viewer in combination with the video data. The text and/or images might, for example, explain what one or more events shown in a portion the video sequence (e.g., "The pitcher throws the ball" in a video sequence showing a baseball match). More generally, if the video sequence describes one or people carrying out an activity including multiple phases (e.g., phases which are defined at the periods between two of the events), the annotation data might specify which phase of the activity any given data item (e.g. frame of the video sequence) relates to. Alternatively the text and/or images might provide advertising data related to the content of the video sequence ("Pitcher uniforms may be obtained from store XXX").

Optionally, the alignment method may be conducted while one of the data sequences is being captured (e.g. with steps of the alignment method being performed at the same time as data capture steps, and/or with steps of the alignment method being interleaved with data capture steps). For example, as a first of the data sequences is captured, data item by data item, the alignment method may be carried out on each successive first data item of the first data sequence to associate the first data item with one of the data items of the second sequence, and the alignment may happen for each first data item concurrently with the capture of the next data item of the first sequence. Annotation data attributed to the data item of the second sequence may then be attributed to associated data items of the first sequence. This provides a real-time method of generating annotation data to annotate sensor data as it is captured.

One example of this process would be if the first data items are sensor data characterizing a real-world environment, and as the sensor data is captured, the corresponding annotation data is generated and used to generate control data to modify the environment, e.g., to control an agent which operates within the environment, such as by moving within the environment (e.g. moving a tool in the environment). For example, the control data may be generated based on the annotated data, and optionally also based on the first data items and/or the encoded data items produced from the first data items, by a control neural network. Optionally, the control neural network may be successively refined based on rewards which are calculated using a reward function which depends on the control data, and which indicates how well the control data controls the agent to perform a task. In other words, the present method may be used as part of a process of reinforcement learning. For example, the annotation data may be used to identify which of a plurality of phases of the task has been reached in the real-world environment. Based on the determined phase, the process of refining the control neural network may be different. For example, based on the determined phase, the calculation of the reward may be performed using a different respective reward function.

In some implementations, the agent is an electromechanical agent interacting with the real-world environment. For example, the agent may be a robot or other static or moving machine interacting with the environment to accomplish a specific task, e.g., to locate an object of interest in the environment or to move an object of interest to a specified location in the environment or to navigate to a specified destination in the environment; or the agent may be an autonomous or semi-autonomous land or air or sea vehicle navigating through the environment. In some other applications the agent may control actions in a real-world environment including items of equipment, for example in a data center or grid mains power or water distribution system, or in a manufacturing plant or service facility. The observations may then relate to operation of the plant or facility. For example the observations may include observations of power or water usage by equipment, or observations of power generation or distribution control, or observations of usage of a resource or of waste production. The agent may control actions in the environment to increase efficiency, for example by reducing resource usage, and/or reduce the environmental impact of operations in the environment, for example by reducing waste. The actions may include actions controlling or imposing operating conditions on items of equipment of the plant/facility, and/or actions that result in changes to settings in the operation of the plant/facility e.g. to adjust or turn on/off components of the plant/facility.

Alternatively, in a domestic implementation, if a video sequence is captured showing a person carrying out a cooking task (i.e. mixing food ingredients and cooking them), the method might be used to obtain annotation data indicating when the person has completed a certain phase of the task (e.g., mixing the ingredients), and the annotation data may be used to generate control data to control an oven to heat up.

Optionally, a method according to the first aspect may include determining whether one or more of the distance values (e.g. the distance value of one or more encoded data items of the first data sequence from encoded data items of a second data sequence, such as a predefined "ideal" data sequence) meet an anomaly criterion, and if the criterion is met transmitting a warning message (e.g., to a user). For example, the anomaly criterion might be that for at a certain number of the data items the minimum distance value is above a threshold, indicating that the associated data items of the first and second data sequences are not sufficiently similar for the associations to be reliable.

In a second aspect, the specification describes automatic generation of an encoder neural network which is suitable for use as the encoder neural network of the first aspect, but has other uses also. The encoder neural network may be trained automatically, i.e., without human involvement except optionally to initiate the method. The encoder neural network is for transforming an input data item to generate an encoded data item which is a representation of the data item. The encoder neural network can be configured to receive any kind of digital data item as input, such as a data item which is sensor data captured by at a certain time by at least one sensor (e.g. a video camera).

The training procedure may be carried out using training data comprising (e.g., consisting of) a plurality of data sequences. The data sequences may all be data sequences describing a certain activity. For example, the data sequences may be video sequences describing performance of a certain activity (e.g., a task or a sporting activity). In this case, the data item representation produced by the encoder neural network emphasizes features which are in common between the video sequences, in other words features which are salient to the activity.

The encoder neural network may be generated in a "self-supervised" way based on the principle of cycle consistency. That is, the training is based on a cost function which varies inversely with a cycle consistency value. That is, a measure of cycle consistency is obtained based on the encoded data items generated from respective data items of the plurality of data sequences, and used to form a cost function. For example, the negative of the cycle consistency value can be used as the cost function.

The cycle consistency value may be a measure of the likelihood that any given data item of a first of the plurality of data sequences meets a "consistency criterion". The consistency criterion is that the given data item is the data item of the first sequence for which the respective encoded data item is closest to the encoded data item of a specific data item of a second sequence. The specific data item is the data item of the second sequence for which the respective encoded data item is closest to the encoded data item obtained from the given data item. Here closeness is defined according to a distance measure, such as Euclidean distance (or Manhattan distance).

The cycle consistency value may for example be the proportion of data items of the first sequence for which this consistency criterion is true.

The cycle consistency value may be obtained by repeatedly selecting two sequences (e.g. at random) from the plurality of data sequences, using the two selected data sequences respectively as the first and second sequence, selecting data items from the first data sequence, and measuring the proportion of the selected items for which the consistency criterion is true.

In another example, an encoded data item obtained from the given data item of the first data sequence may be used to define respective weights a for each of the data items of the second data sequence, where the weight a is a decreasing smooth function of the distance between the encoded data item for the given data item and encoded data item obtained from the data item of the second sequence. The weights may be used to define a "soft nearest neighbor" for the given encoded data item, as a weighted sum of the encoded data items corresponding to the data items of the second sequence.

The soft nearest neighbor may be used in multiple ways to obtain a cycle consistency value. One way of using it is by defining the cost function as a decreasing function (e.g., the negative of a logarithm) of a value $\hat{y}$ indicating the degree to which the distance, from the soft nearest neighbor, of the encoded data item for the given data item, is less than the distance, from the soft nearest neighbor, of the encoded data items for other data items of the first sequence.

In another example, the cycle consistency value may be defined using the positions of data items within the first data sequence. This position of a given data item may be defined as the corresponding value of an integer index which counts the data items in the data sequence (e.g., the integer index for a first data item in the data sequence may have value 1; the integer index for a second data item in the data sequence may have value 2; etc.). One way of implementing this concept is to use the soft nearest neighbor to generate similarity values $\beta$ for each of the data items of the first sequence (based on the distances between the soft nearest neighbor and the encoded data items obtained from the data items of the first sequence), and then obtain the cycle consistency values based on the distribution of the similarity values along the first data sequence. For example, the distribution may have a mean position $\mu$ in the first data sequence (if the distribution is Gaussian, this may be the maximum of the distribution; indeed, the value $\mu$ may be defined as the maximum of the distribution rather than as the mean), which may be considered an estimated position of the given data item. The cost function may be based on the distance of the position $\mu$ from the position of the given data item. It may further include a variance term indicating the variance of the distribution of similarity values.

The cost function may optionally comprise further terms, e.g., a cost function of a "shuffle-and-learn" network, and/or a cost function of a "time contrastive network".

As described above, one application of the trained encoder neural network of the second aspect of the disclosure is as the encoder neural network used in the first aspect. Another application of it is as a component of a classification neural network. The classification neural network comprises the trained encoder neural network and also an output neural network, having network parameters. When a data item is input to the encoder network, the output neural network may be arranged to receive as an input the output of the encoder network (i.e. the representation of the data item), and to generate from it output data which indicates that the data item belongs to one of a set of classes. The output neural network may be trained by supervised learning. During this time the encoder neural network may not be trained further.

Like the encoder neural network, the classification neural network can be configured to receive any kind of digital data input and to generate any kind of score, classification, or regression output based on the input.

For example, if the inputs to the classification neural network are images or features that have been extracted from images, the output generated by the classification neural network for a given image may be scores for each of a set of object categories, with each score representing an estimated likelihood that the image contains an image of an object belonging to the category.

As another example, if the input to the classification neural network is a sequence of text in one language, the output generated by the classification neural network may be a score for each of a set of pieces of text in another language, with each score representing an estimated likelihood that the piece of text in the other language is a proper translation of the input text into the other language.

As another example, if the input to the classification neural network is a sequence representing a spoken utterance, the output generated by the classification neural network may be a score for each of a set of pieces of text, each score representing an estimated likelihood that the piece of text is the correct transcript for the utterance.

The subject matter described in this specification can be implemented in particular embodiments so as to realize one or more of the following advantages.

An encoder network is provided which is able to extract, from a data item such as a captured real-world image, information which is relevant to an activity. The encoder neural network can be trained without manually labelled training data.

The trained encoder neural network can be used to search a video sequence, based on an input image, to find a frame of the video sequence most closely corresponds to the input image, in particular a frame of the sequence which has the same significance for the activity as the input frame. In this way it is able to provide automated searching of video.

Furthermore, it is able to provide automated annotation of data item(s) of a data sequence, e.g., a library of video segments. In the case of video showing an environment (real or simulated), the annotation can be used to influence the environment, e.g., to enable an activity of an agent in the environment to be performed more successfully.

Furthermore, the disclosure provides a classification neural network which can be trained to generate data labels which characterize input data items, using less labelled training data than known classification neural networks.

BRIEF DESCRIPTION OF THE DRAWINGS

Examples of the implementation of the concepts described in this document will now be explained with reference to the following drawings:

FIG. 3 shows a method performed by the system of FIG. 1.

FIG. 5 shows a method performed to generate an encoder neural network of the system of FIG. 1;

DETAILED DESCRIPTION

Figure 1:
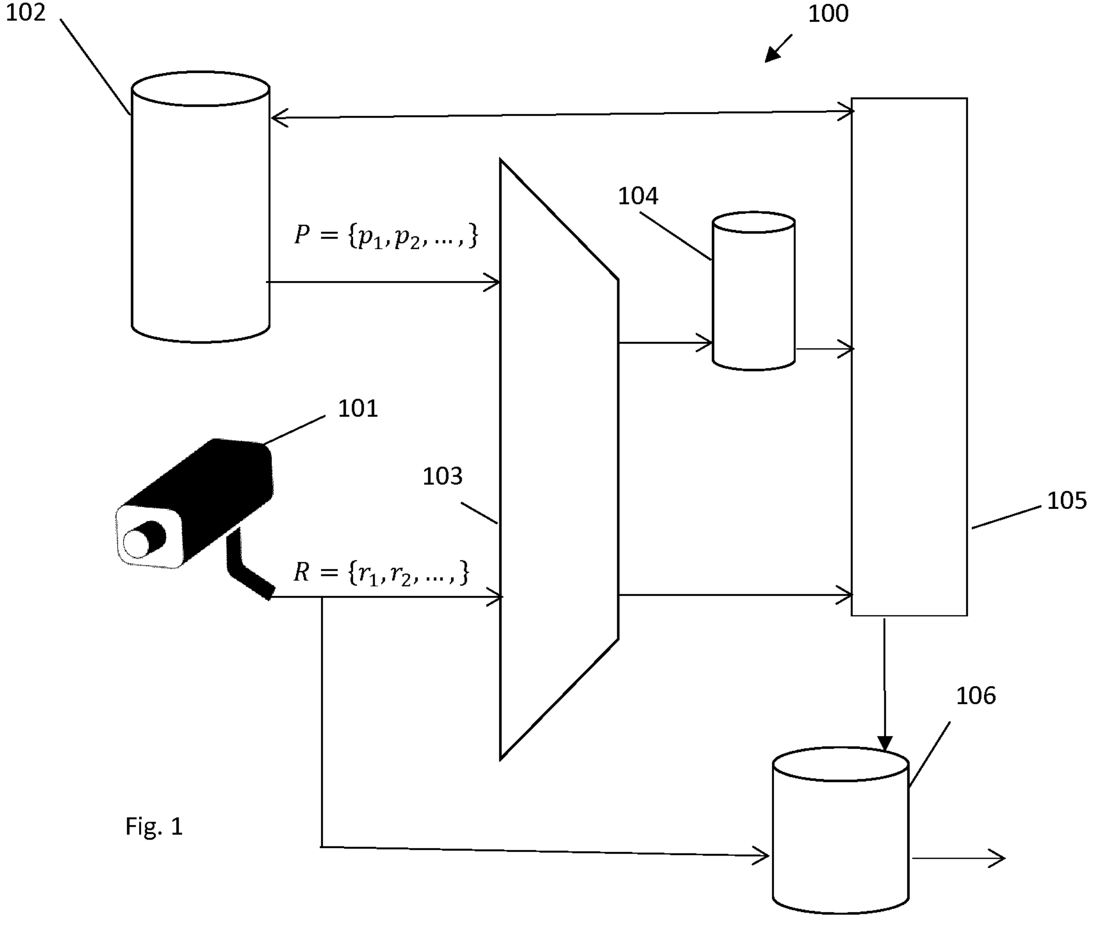
FIG. 1 shows a computer system comprising an encoder neural network.

Referring firstly to FIG. 1, a computer system 100 is shown which employs some of the concepts disclosed in this document. The system 100 includes a video camera 101 for generating a video sequence R composed of a sequence of frames (i.e. images) $\{r_1, r_2, \ldots,\}$. The video camera 101 is configured to capture the sequence of frames $\{r_1, r_2, \ldots,\}$ successively as images of a certain (real-world) first environment. Whatever happens in the environment at the time corresponding to one of the images is referred to as a first "event". Thus, each first data item characterizes the corresponding first event. In some cases, two or more of the images may be substantially identical (e.g. if the environment is empty at the time those images are taken, or if a person in the environment does not move between the times when the images are taken).

Note that the images $\{r_1, r_2, \ldots,\}$ are captured sequentially, and thus have a defined order. Each image $\{r_1, r_2, \ldots,\}$ is referred to as a first data item, and the video sequence R is referred to as a first data sequence. In variations of the system, the video camera 101 may be replaced may an interface for receiving the video sequence R from an external source.

The system further comprises a database 102 which stores a pre-existing video sequence P. The video sequence P is composed of a sequence of images $\{p_1, p_2, \ldots,\}$. The images are captured sequentially, and thus have a defined order. Each image $\{p_1, p_2, \ldots,\}$ is referred to as a second data item, and the video sequence P is referred to as a second data sequence. Each image $\{p_1, p_2, \ldots,\}$ is an image captured of a second environment (which may the same or different from the first environment). It characterizes what is happening in the second environment at the time when that image is taken, which is referred to as a second "event".

In variations of the system 100, the video sequence R and the pre-existing video sequence P may be replaced with data sequences which are not video sequences. Each data sequence R or P still consists of an ordered sequence of data items, and the data items may still optionally be images, but each sequence of data items does not constitute a video sequence. For example, the first and second data sequence may be composed of images of the respective environment captured at an ordered series of respective times, but not by the same camera. Furthermore, each of the data items of at least one of the sequences may comprise multiple images of the corresponding environment, e.g. captured by multiple respective video cameras configured to image the corresponding environment. Alternatively, each data sequence may be composed of data items which each comprise, or consist of, data which is not image data (such as sensor data collected by a sensor which is not a camera) but which still characterizes the event in the corresponding environment at the corresponding time. For example, each data item may represent a sound captured by a microphone in the corresponding environment at a corresponding time. The first and second environments are preferably real-world environments, though in principle either or both could be environments simulated by a computer system.

Some or all of the images $\{p_1, p_2, \ldots,\}$ are associated with respective annotation data, which may be stored in the database 102. For example, annotation data $\{\tilde{p}_3, \tilde{p}_7, \tilde{p}_{376}\}$ may exist, with $\tilde{p}_3$ being annotation data associated with image $p_3$ in P, $\tilde{p}_7$ being annotation data associated with image $p_7$ in P, and $\tilde{p}_{376}$ being annotation data associated with image $p_{376}$ in P.

Each of the second data items $\{p_1, p_2, \ldots,\}$ are input sequentially to an encoder neural network 103. The encoder neural network 103 outputs respective second encoded data items denoted $\{x_1, x_2, \ldots,\}$. The second encoded data items are stored in a database 104.

Typically after this process has finished, the first data items $\{r_1, r_2, \ldots,\}$ of the first data sequence S are input sequentially to the encoder neural network 103. The encoder neural network 103 outputs respective first encoded data items $\{w_1, w_2, \ldots,\}$. For example, at time i the first data item may be denoted $r_i$ and the corresponding first encoded data item is denoted $w_i$.

Each of the first encoded data items $\{w_1, w_2, \ldots,\}$ and second encoded data items $\{x_1, x_2, \ldots,\}$ is composed of the same number of components, which is typically greater than one.

Each first encoded data item $w_i$ is input (e.g. successively) to a processor 105. The processor 105 accesses the database 104, and for each second encoded data item (say $x_k$) determines the distance value $d_{i,k}$ between $w_i$ and $x_k$ according to a distance measure. For example, the distance measure may be the Euclidean distance between $w_i$ and $x_k$. In variations, another distance measure may be used, such as the Manhattan distance.

The processor 105 identifies ("determines") the second data item $p_k$ corresponding to the second encoded data item $x_k$ for which $d_{i,k}$ is lowest. The processor 105 associates the determined second encoded data item $x_k$ with the first encoded data item $w_i$, or to put this equivalently, associates the determined second data item $p_k$ with the first data item $r_i$. This may be done by generating a record of the association in a database 106. The record is metadata associating the values i and k.

The processor 105 communicates with the database 102 to determine whether the determined second data item $\tilde{p}_k$ is associated with annotation data stored in the database 102. If so, that annotation data is associated with the first data item in the database 106.

The results of the association (including the annotation data, if any) may be transmitted from the system 100 (e.g. from the database 106) to be used in any number of ways. For example, if the video sequence R shows an agent (e.g. an electro-mechanical agent such as a robot) which performs a task in the first environment (e.g. navigation in the first environment, or another movement in the first environment such as manipulating a tool in the first environment), the annotation data may label phases of the task. This information may be used as an input to a control program which controls the agent to perform the task, e.g. to indicate that the agent has successfully completed one phase of the task, for example such that it should now be controlled to perform another phase of the task. If the task is still being learnt by a reinforcement learning process, the annotation data may be used to control a reward function for the agent.

In another possibility, the video sequence R may show at least one human moving in the first environment, and the annotation data may indicate that the actions of the human are such that a device in or near the first environment should be controlled in a certain way. In this case, the output of the system 100 may be a control signal to the device. For example, if the annotation data which the system 100 associates with a certain video image of the video sequence R indicates that the human has finished a certain stage of preparing an item of food, the output of the system 100 may be used to control an oven for cooking the food. In a further example, the annotation data may be used to generate scoring data (e.g. for display to the human) to indicate how well (e.g. how quickly) the human has performed a certain phase of a task.

Figure 2:
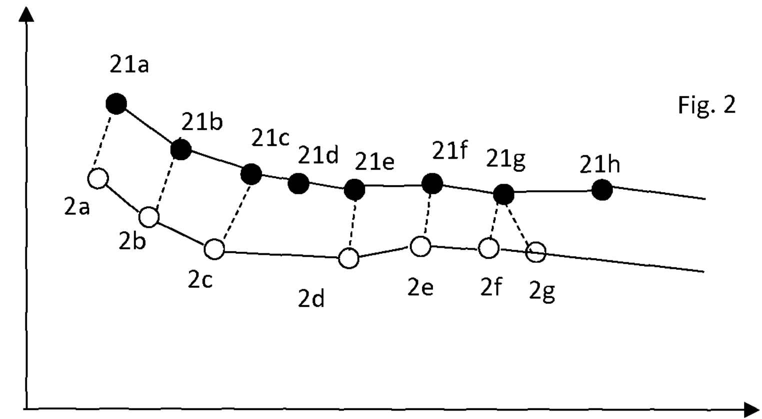
FIG. 2 illustrates the output of the system of FIG. 1.

The process performed by the system 100 of associating each first data item with a corresponding determined second data item is illustrated in FIG. 2. This represents the space of outputs of the encoder neural network (the "learned embedding space") as a two-dimensional space. Note that although the output of the encoder neural network may indeed in principle be only two dimensional (i.e. comprise only two numerical values), more preferably its dimensionality is greater than two, and in the latter case the representation in FIG. 2 is schematic. The first encoded data items corresponding to the respective first data items in the first data sequence are illustrated in FIG. 2 as the hollow circles 2*a*, 2*b*, 2*c*, 2*d*, 2*e*, 2*f*, 2*g*, where the solid lines between the circles illustrate the sequence of the corresponding first data items, e.g. the first data item in the first data sequence corresponds to the first encoded data item 2*a*. The second encoded data items corresponding to the respective second data items in the second data sequence are illustrated in FIG. 2 as the solid circles 21*a*, 21*b*, 21*c*, 21*d*, 21*e*, 21*f*, 21*g* and 21*h*, where the solid lines between the circles illustrate the sequence of the corresponding second data items, i.e. the first second data item in the second data sequence corresponds to the first second encoded data item 21*a*.

The dashed lines show the associations between first data items and corresponding second data items obtained by the processor 105. For example, the processor 105 associates first data item corresponding to first encoded data item 2*b* with the second data item corresponding to second encoded data item 21*b*. This is because, of all the second encoded data items shown in FIG. 2, the second encoded data item 21*b* is closest in the learned embedding space to the first encoded data item 2*b*.

The first data item for every first encoded data item is associated with a corresponding second data item. Note that no first data item is associated with the second data item corresponding to the second encoded data item 21*d*.

More generally, the number of first data items and second data items may be different, with either being greater than the other.

It is also possible for more than one first data item to become associated with a single second data item. This would happen if there are multiple first data items for which the corresponding first encoded data items have the same second encoded data item as their closest second encoded data item. For example, the first encoded data items 2*f*, 2*g* both have the second encoded data item 21*g* as their closest second encoded data item.

The process 300 carried out by the system 100 of FIG. 1 is illustrated in FIG. 3. In step 301, the encoder neural network encodes each first data item of a first data sequence R to form a corresponding first encoded data item.

In step 302, the encoder neural network encodes each second data item of a second data sequence P to form a corresponding second encoded data item.

Note that step 302 may be performed before step 301 or concurrently with it. In the explanation of FIG. 1 given above, step 302 was explained as being before step 301.

In one possibility, the method 300 is carried out concurrently with the capture of the first data items of the first data sequence R (e.g. by the video camera 101 and/or by another camera and/or sensor). In this case, step 302 is typically carried out before the first data sequence R is captured, and steps 301 and 303 onwards of the method are carried out concurrently with the capture of the first data sequence R, e.g. while each successive data item of the first data sequence R is captured, the method 300 is being performed in respect of the preceding data item of the first data sequence R.

In step 303, the method 300 selects a first data item from the first data sequence R. If the first data sequence R is being captured concurrently with the performance of the method 300, this may be the most recently captured first data item.

In a variation of the method 300, the encoding step 301 may alternatively be performed after step 303. In either case, when step 301 is carried out in respect of the selected first data item, the encoder neural network generates a corresponding first encoded data item.

In step 304, the method 300 determines, for each of a plurality of the second data items, a respective distance value indicative of a distance between the first encoded data item corresponding to the selected first data item, and the corresponding second encoded data item. This distance value is calculated according to a distance measure (e.g. it may be the Euclidean distance between the corresponding first encoded data item and the corresponding second encoded data item).

Note that optionally step 304 can be performed in respect of all the second data items. Alternatively, to reduce the computational burden, it may only be performed in respect of second data items which meet a certain criterion. For example, step 304 may only be performed for second data items which are within a certain range in the second data sequence P containing a specified one of the second data items. The specified second data item may, for example, be a second data item which has previously been associated with a first data item which is the predecessor of the selected first data item in the video sequence R.

In step 305, the method 300 determines (identifies) the second data item, out of the plurality of second data items used in step 304, for which the corresponding distance value is lowest.

In step 306, the method 300 associates the first data item selected in step 303 with the second data item determined in step 305. This association may be stored in the database 106.

In step 307, any annotation data associated with the second data item which was determined in step 306 is associated with the first data item selected in step 303.

In step 308, it is determined whether a termination criterion has been reached. For example, the termination criterion may depend upon whether a signal has been received from outside the system 100 indicating that a task performed in the first environment is over, or that the first data sequence R has terminated. Alternatively or additionally, the termination criterion may be depend upon the second data item determined in step 306. For example, the termination criterion may be whether the determined second data item is in a certain range in the second data sequence P (e.g. whether it is the final second data item in the second data sequence P).

If the termination criterion is not met, the method 300 may return to step 303, to select a new first data item (e.g. the first data item which is next in the first data sequence R after the first data item which was selected the last time step 303 was performed). If the termination criterion is met, the method 300 ends.

We now turn to a discussion of methods for generating the encoder neural network 103 of system 100 shown in FIG. 1. The encoder neural network is trained based on training data which is at least two data sequences (i.e. sequences of data items, such as video frames) showing similar respective sequences of events in the same or different environments. For example, each sequence of events may be the attempts of at least one human and/or an electro-mechanical agent to perform a task, e.g. a task having a plurality of phases which are performed in the same order in each of the data sequences. Typically, the number of data sequences in the training set is much greater than two.

Figure 4:
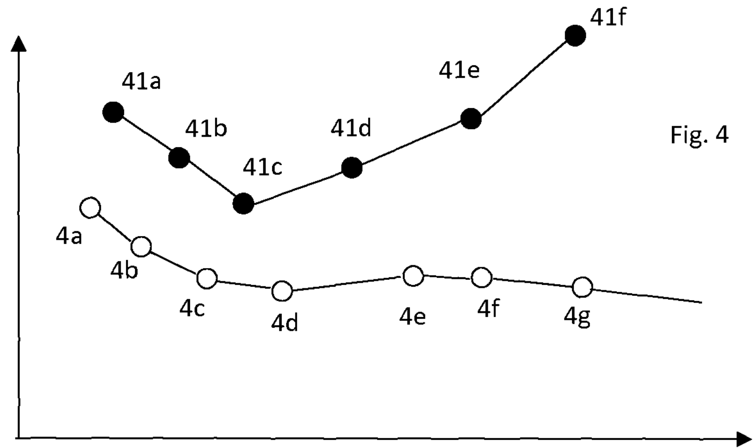
FIG. 4 illustrates the concept of cycle-consistent representation learning.

In general terms, the training is done by maximizing the number of points that can be mapped one-to-one between two data sequences by using the minimum distance in the learned embedding space. More specifically, it is done by maximizing the number of cycle-consistent frames between two sequences. This concept is illustrated in FIG. 4. As in FIG. 2, the two-dimensional area of FIG. 4 illustrates the embedding space (i.e. the space having dimensions which are the respective numerical components of the output of the encoder neural network). If the output of the encoder neural network consists of only two numbers, then the embedding space is two-dimensional as shown in FIGS. 2 and 4, but if the output of the encoder neural network comprises more than two numbers (as is typically the case) FIGS. 2 and 4 are schematic.

The hollow circles 4*a*, 4*b*, 4*c*, 4*d*, 4*e*, 4*f*, 4*g* illustrate the outputs of the untrained (or semi-trained) encoder neural network when it respectively receives data items of a first of the data sequences. That is, the hollow circles 4*a*, 4*b*, 4*c*, 4*d*, 4*e*, 4*f*, 4*g* illustrate respective encoded data items for the respective data items of the first data sequence. The solid circles 41*a*, 41*b*, 41*c*, 41*d*, 41*e*, 41*f* illustrate respective encoded data items for the respective data items of a second of the data sequences.

The first encoded data item 4*c* is cycle consistent, in the sense that considering the second encoded data item which is closest to it (i.e. second encoded data item 41*c*), the first encoded data item which is closest to this second encoded data item 41*c* is first encoded data item 4*c* itself. In other words, if one starts at the first encoded data item 4*c*, and moves to the nearest second encoded data item (i.e. second encoded data item 41*c*), and then moves to the nearest first encoded data item, one returns to the same first encoded data item 4*c* where one started.

By contrast, first encoded data item 4*g* is not cycle consistent. This is because, considering the second encoded data item which is closest to it (which is second encoded data item 41*e*), the first encoded data item which is closest to this second encoded data item 41*e* is first encoded data item 4*f*. In other words, if one starts at the first encoded data item 4*g*, and moves to the nearest second encoded data item (i.e. second encoded data item 41*e*), and then moves to the nearest first encoded data item, one reaches first encoded data item 4*f*, rather than the first encoded data item 4*g* where one started.

Of course, if the parameters of the encoder neural network 102 are changed, the positions of the first and second encoded data items in the embedding space change also. In general terms, the encoder neural network 102 is trained iteratively to increase the number of first encoded data points which are cycle consistent.

Let us consider the two data sequences (e.g. video sequences) in the training set denoted S and T. Data sequence S is the sequence of N data items $\{s_1, s_2, \ldots, s_N\}$, and data sequence T is the sequence of M data items $\{t_1, t_2, \ldots, t_M\}$. In the case that the data sequences S and T are video sequences, each data item may be a frame. Note that N and M may be the same or different. When any data item (frame) $s_1$ is input to the encoding neural network, the encoded data item (embedding) output by the encoder neural network is denoted by $u_i=\phi(s_i, \theta)$, where θ denotes the set of numerical parameters of the encoder neural network, and ϕ denotes the function performed by encoder neural network parameters θ. The sequence of encoded data items generated from the data sequence S (i.e. the embedding of S) is denoted by $U=\{u_1, u_2, \ldots, u_N\}$, such that $u_i=(s_i, \theta)$, and the sequence of encoded data items generated from the data sequence T is denoted by $V=\{v_1, v_2, \ldots, v_M\}$, such that $v_i=\phi(t_i, \theta)$.

In order to check whether a point $u_i \in U$ is cycle consistent, one first determines its nearest neighbor, $v_j=\text{argmin}_{v\in v}\|u_i-v\|$. One then repeats the process to find the nearest neighbor of $v_j$ in U, i.e. $u_k=\text{argmin}_{u\in U}\|v_j-u\|$. The point $u_i$ is cycle-consistent if and only if i=k, in other words if the point $u_i$ cycles back to itself. The present method learns a good embedding space by maximizing a measure of the number of the number of cycle-consistent points for any pair of sequences. This measure is referred to as a cycle consistency value. It indicates that likelihood that a given (e.g. randomly-chosen) one $s_i$ of the data items of the first data sequence S is cycle consistent (i.e. the data item $s_i$ is the data item of the first data sequence S for which the respective encoded data item $u_i$ is closest according to a distance measure to the encoded data item $v_i$ of a specific data item $t_k$ of the second data sequence T, the specific data item $t_k$ being the data item of the second data sequence T for which the respective encoded data item $v_j$ is closest according to the distance measure to the encoded data item $u_i$ of the given data item $s_i$).

Referring to FIG. 5 a flow diagram is shown of a method 500 which may be performed by one or more computers in one or more locations (such as by one or more processors of a general computer system), to generate the encoder neural network.

In step 501 of method 500, two data sequences are selected (e.g. randomly) from the training set of data sequences. These two data sequences are labelled S and T.

In step 502, a current version of the encoder neural network is used to obtain respective encoded data items $\{u_1, u_2, \ldots, u_N\}$ for each data item of the first data sequence S, and respective encoded data items $\{v_1, v_2, \ldots, v_M\}$ for each data item of the second data sequence T. On the first occasion step 502 is performed, the current version of the encoder neural network may have parameters which are chosen at random.

In step 503, a cycle consistency value for S and T is obtained using $\{u_1, u_2, \ldots, u_N\}$ and $\{v_1, v_2, \ldots, v_M\}$, and a cost function is formed which varies inversely with the cycle consistency value.

In step 504, an update is determined to the parameters θ of the encoder neural network to reduce the cost function.

In step 505, it is determined whether a termination criterion has been met (e.g. the number of times that the set of steps 501-504 has been performed is above a threshold, and/or the cost function the last time step 504 was performed was below the cost function the previous time step 504 was performed by less than a threshold amount). If so, the method 500 terminates. If not, the method 500 loops back to step 501, using the updated encoder neural network as a new current encoder neural network, to select two new data sequences S and T from the training set.

In one form of the method 500, only a selected subset of the data items of one or both sequences S, T may be employed in step 502 (e.g. different sub-sets each time step 502 is performed). In this case, only the encoded data items for that subset of data items may be used the following time that steps 503-505 are carried out. For example, step 502 might involve only a selected single data item of the first data sequence S, and some or all of the data items of the second data sequence T. The selected single data item of S could be different each time step 502 is performed.

In principle, in method 500 the number of cycle-consistent points in S and/or T could be used directly as the cycle consistency value. However, it is preferable to use a differentiable measure as the cost function defined in step 504, and two such measures are introduced below.

A first possibility is to define the cycle consistency value as the "cycle-back classification". That is, for the or each encoded data item $u_i$ generated in step 502, in step 503 a soft nearest neighbor $v^{\sim}$ of $u_i$ in V is derived. For the selected $u_i$, its soft nearest neighbor is defined as:

$$\tilde{v} = \sum_{j}^{M} \alpha_j v_j \text{ where } \alpha_j = \frac{e^{-\|u_i - v_j\|_z}}{\sum_{k}^{M} e^{-\|u_i - v_k\|_z}}. \quad (1)$$

The variable $\alpha_1$ is a similarity distribution which signifies the proximity between $u_i$ and $v_j$. z is typically 2, so that the norm $\| \|_z$ denotes Euclidean distance.

It is then determined which of the encoded data items in U is the nearest neighbor of $\tilde{v}$. The cost function is derived by analogy to a classification task, by treating each data item of the sequence U as a separate class, such that checking for cycle-consistency reduces to classification of the nearest neighbor correctly. The classification amounts to attaching a label $\hat{y}$ to the soft nearest neighbor $\tilde{v}$ with a softmax function. Specifically, $\hat{y}$=softmax($\{x_k\}$), where the logits $\{x_k\}$ are calculated using the distances between and any $u_k \in U$.

Step 503 employs ground truth labels y for each of the data items of S, which are all zeros except for the ground truth label $y_i$ which is set to 1. Step 503 defines the cost function which is reduced in step 504 as the cross-entropy loss as follows:

$$L_{cbc} = -\sum_{j}^{N} y_j \log(\hat{y}_j). \quad (2)$$

Figure 6:
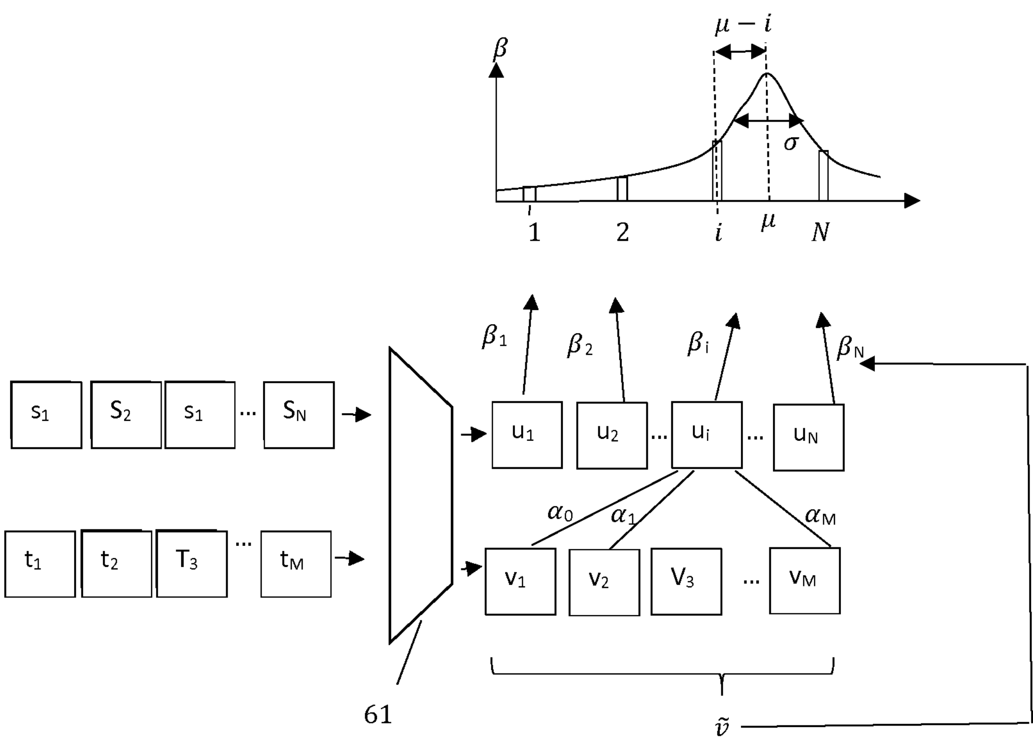
FIG. 6 illustrates a process which is optionally employed in the method of FIG. 5.

Although this cycle-back classification defines a differentiable cycle-consistency loss function, it does not take into account the distance from $u_i$ to the point in U which is reached by jumping to the nearest encoded data item in V, and then jumping back to the nearest point in U. It is desirable to penalize the model less if this distance is less. In order to incorporate temporal proximity in the cost function, an alternative way for defining the cycle consistency value is based on the concept of cycle-back regression. This is illustrated in FIG. 6. The left part of FIG. 6 illustrates schematically how the data sequences S, T are used by an encoder neural network 61 to generate encoded data sequences U and V. Similar to the previous method of the defining the cycle consistency value, in the technique of FIG. 6 step 503 begins by deriving a soft nearest neighbor $\tilde{v}$ of $u_i$ in V using Eqn. (1). Step 503 then computes a similarity vector β that defines the proximity between 17 and each $u_k \in U$ as:

$$\beta_k = \frac{e^{-\|\tilde{v} - u_k\|^2}}{\sum_{j}^{N} e^{-\|\tilde{v} - u_j\|^2}}. \quad (3)$$

Note that β is a discrete distribution of similarities over time and we expect it to show a peaky behavior near the i-th index in time.

Accordingly, step 503 imposes a Gaussian prior on β (as shown in the top right of FIG. 6), by deriving a mean position μ of the distribution of β (which may be the maximum of the distribution), and its standard deviation σ, and forming the cost function such that step 504 minimizes the normalized squared distance $$\frac{|i - \mu|^2}{\sigma^2}.$$

Alternatively, and more preferably, method 500 enforces β to be more peaky around i by applying additional variance regularization. Thus, step 503 defines the cost function as:

$$L_{cbr} = \frac{|i - \mu|^2}{\sigma^2} + \lambda \log(\sigma). \quad (4)$$

where $$\mu = \sum_{k}^{N} \beta_k * k$$

and $$\sigma^2 = \sum_{k}^{N} \beta_k * (k - \mu)^2,$$

and λ is the regularization weight.

Note that method 500 preferably minimizes the log of variance, because using just the variance was found to be more prone to numerical instabilities.

The above formulations of $L_{cbr}$ are differentiable and can conveniently be optimized with conventional back-propagation. Experimentally, it was found that the cycle-back regression approach of FIG. 6 and Eqn. (4) performed with lower performance loss than the cycle-back classification approach of Eqn. (2).

The method of FIG. 5 was implemented experimentally using the Tensorflow software library, using video sequences as the data sequences. All the frames of each video sequence in the training set were resized to 224×224 pixels. ImageNet pre-trained features were used with a ResNet-50 architecture to extract features from the output of a Conv4c layer (a well-known type of convolutional layer). The size of the extracted convolutional features were 14×14×1024. Because of the size of the datasets, the training initially used a smaller model along the lines of a VGG-M (a known deep learning model suggested by the VGG (visual geometry group)). This network takes input at the same resolution as ResNet-50 but is only 7 layers deep. The convolutional features produced by this base network were of the size 14×14×512. These features were provided as input to the encoder neural network.

The encoder neural network comprises temporal stacking layers which stacked k context frames along the dimension of time, to generate an output of size kx14x14xc. This is followed by 3D convolutions for aggregating temporal information, using [3x3x3,512]x2 parameters, to generate an output of size kx14x14x14x512. The encoder neural network then reduced the dimensionality by using 3D max-pooling, to generate an output with 512 parameters, followed by two fully connected layers (having [512]x2 parameters) to generate an output with 512 values. Finally, the encoder network used a linear projection to get a 128-dimensional encoding (embedding) for each frame.

By training an encoder neural network and then employing it in a system according to FIG. 1 and the method 300 of FIG. 3, e.g. taking one video from the training set as the video sequence P and another captured video sequence as the video sequence R, it was possible to the temporally align video sequences P and R without supervision (i.e. to define time(s) in one of the video sequences which corresponded to respective time(s) in the second video sequence). This enabled transfer of text data, or other modalities of annotation data, from one video to another (e.g. from P to R). For example, this provided a technique involving little or no human interaction for transferring text annotations from a single video sequence to an entire database of related videos. Alternatively or additionally, other modalities of annotation data could be transferred. For example, the annotation data may be in the form of sound data (e.g. voice data labelling a phase of the process shown in the video sequences, or a sound effect appropriate to the process).

Another application of the aligned videos was to extract a set of one or more frames from the data sequence R, by determining a frame in the video sequence R as a frame corresponding to a defined frame of the video sequence P, and extracting the set of frames as a set of frames based on the determined frame.

Another application of the aligned videos was anomaly detection. Since the alignment method tends to produce well-behaved nearest neighbors in the embedding space, the distance from an ideal trajectory in this space was used detect anomalous activities in videos. Specifically, it was determined whether the trajectory of video R in the embedding space (i.e. the corresponding sequence of encoded data items) met a deviation criterion indicating of the trajectory deviating too much from a predetermined "ideal" trajectory P in the embedding space. Any frame of R for which the corresponding encoded data item met this criterion was marked as anomalous.

A further application of the alignment method was to allow the videos P and R to be played back synchronously, i.e. such that corresponding events in the two videos are displayed to a user as the same time. In other words, based on the alignment produced by the method of FIG. 3, the pace of one of the videos P and R was used to control the pace of the presentation of the other of the videos P and R, for example so that P and R could be simultaneously displayed by a display system with corresponding events (according to the alignment) being displayed at the same time.

Figure 7:
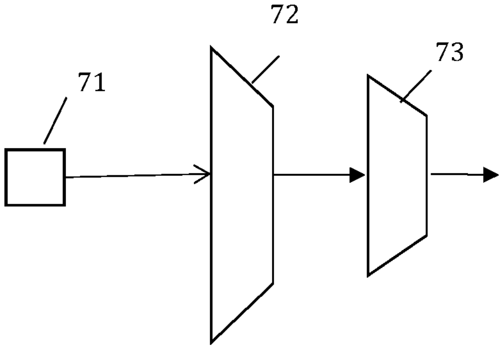
FIG. 7 illustrates a classification neural network which comprises the encoder neural network.

A further application of the encoder neural network is shown in FIG. 7. In this case, a data item 71 such as an image (e.g. of the real-world captured by a camera) is input to a classification neural network comprising a encoder neural network 72 (which takes the same form as the encoder neural network 102 of FIG. 1) and an output neural network 73. The output of the encoder neural network 72 is passed to the output neural network 73. The output neural network 73 has been trained to classify the output of the trained encoder neural network 72, and thereby generate an output which indicates that the data item 71 is in one of a plurality of classes. Because the encoder neural network has been trained based on video sequences captured in a multiple respective environments and/or at different respective times, but all characterizing a common process carried out in each of those environments and/or at those times, upon receiving a data item 71 showing an event in the process, the encoder neural network 72 tends to output data which is indicative of features characterizing the corresponding stage of the process, rather than features which vary from environment to environment and which may be independent of the process. Thus, the encoder neural network 72 provides a pre-processing of the data item 71 which makes it easier for the output neural network 73 to classify the data item into classes related to the process. For example, the classes may relate to respective phases of the process, such that the output neural network 73 is able to generate data indicating which phase of the process the data item 71 relates to.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method of aligning two video sequences of events using a single encoder neural network, a first video sequence of the two video sequences being a sequence of first video frames each comprising image data captured by at least one video camera, and a second video sequence of the two video sequences being a sequence of second video frames each comprising image data captured by at least one video camera, the sequence of first video frames depicting respective first events which occur in a first environment at successive first times, and the sequence of second video frames depicting respective second events which occur in a second environment at successive second times, the first video sequence depicting a first task and the second video sequence depicting a second task, the first task and the second task each having a plurality of corresponding phases that are performed in the same order in the first and second video sequences, the method comprising the steps of:

encoding the first video sequence using an encoder neural network to form, from each first video frame of the sequence of first video frames, a corresponding first encoded video frame;

attributing annotation data to one or more first video frames of the first video sequence, wherein the annotation data specifies a phase of the first task performed in an environment to which a video frame to which it is attributed relates;

encoding the second video sequence using the encoder neural network to form, from each second video frame of the sequence of second video frames, a corresponding second encoded video frame; and for at least one first video frame of the sequence of first video frames:

(i) for each of a plurality of the second video frames, determining a respective distance value indicative of a distance between the corresponding first encoded video frame and the corresponding second encoded video frame according to a distance measure;

(ii) determining one of the plurality of second video frames for which the corresponding distance value is lowest;

(iii) associating the first video frame and the determined one of the plurality of second video frames, to associate the corresponding first event with the corresponding second event, the first and second events being events of a same type;

(iv) based on the association of the first event and the second event, associating the annotation data with second video frames of the second video sequence; and (v) using the annotation data associated with the second video frames of the second video sequence as an input to a control program to determine that a first phase of the second task has been completed and to initiate a second phase of the second task.

2. A method according to claim 1 in which the steps are performed while the sequence of first video frames of the first video sequence are datasets successively captured by at least one sensor and characterizing a real world environment at successive times.

3. A method according to claim 2, wherein using the annotation data associated with the second video frames of the second video sequence as an input to a control program comprises: in response to capturing a video frame of the first video sequence, and associating the first video frame and the determined one of the plurality of second video frames, identifying the annotation data associated with the determined one of the plurality of second video frames, using the annotation data to generate control signals, and based on the control signals, modifying the real world environment.

4. A method according to claim 1 further comprising determining whether one or more of the distance values meet an anomaly criterion, and if the anomaly criterion is met transmitting a warning message.

5. A system comprising one or more computers and one or more storage devices storing instructions that when executed by the one or more computers cause the one or more computers to perform operations for aligning two video sequences of events using a single encoder neural network, a first video sequence of the two video sequences being a sequence of first video frames each comprising image data captured by at least one video camera, and a second video sequence of the two video sequences being a sequence of second video frames each comprising image data captured by at least one video camera, the sequence of first video frames depicting respective first events which occur in a first environment at successive first times, and the sequence of second video frames depicting respective second events which occur in a second environment at successive second times, the first video sequence depicting a first task and the second video sequence depicting a second task, the first task and the second task each having a plurality of corresponding phases that are performed in the same order in the first and second video sequences, the operations comprising:

encoding the first video sequence using an encoder neural network to form, from each first video frame of the sequence of first video frames, a corresponding first encoded video frame;

attributing annotation data to one or more first video frames of the first video sequence, wherein the annotation data specifies a phase of the first task performed in an environment to which a video frame to which it is attributed relates;

encoding the second video sequence using the encoder neural network to form, from each second video frame of the sequence of second video frames, a corresponding second encoded video frame; and for at least one first video frame of the sequence of first video frames:

(i) for each of a plurality of the second video frames, determining a respective distance value indicative of a distance between the corresponding first encoded video frame and the corresponding second encoded video frame according to a distance measure;

(ii) determining one of the plurality of second video frames for which the corresponding distance value is lowest;

(iii) associating the first video frame and the determined one of the plurality of second video frames, to associate the corresponding first event with the corresponding second event, the first and second events being events of a same type;

(iv) based on the association of the first event and the second event, associating the annotation data with second video frames of the second video sequence; and (v) using the annotation data associated with the second video frames of the second video sequence as an input to a control program to determine that a first phase of the second task has been completed and to initiate a second phase of the second task.

6. A system according to claim 5 in which the operations are performed while the sequence of first video frames of the first video sequence are datasets successively captured by at least one sensor and characterizing a real world environment at successive times.

7. A system according to claim 6 wherein using the annotation data associated with the second video frames of the second video sequence as an input to a control program comprises: in response to capturing a video frame of the first video sequence, and associating the first video frame and the determined one of the plurality of second video frames, identifying the annotation data associated with the determined one of the plurality of second video frames, using the annotation data to generate control signals, and based on the control signals, modifying the real world environment.

8. One or more non-transitory computer storage media storing instructions that when executed by one or more computers cause the one or more computers to perform operations for aligning two video sequences of events using a single encoder neural network, a first video sequence of the two video sequences being a sequence of first video frames each comprising image data captured by at least one video camera, and a second video sequence of the two video sequences being a sequence of second video frames each comprising image data captured by at least one video camera, the sequence of first video frames depicting respective first events which occur in a first environment at successive first times, and the sequence of second video frames depicting respective second events which occur in a second environment at successive second times, the first video sequence depicting a first task and the second video sequence depicting a second task, the first task and the second task each having a plurality of corresponding phases that are performed in the same order in the first and second video sequences, the operations comprising:

encoding the first video sequence using an encoder neural network to form, from each first video frame of the sequence of first video frames, a corresponding first encoded video frame;

attributing annotation data to one or more first video frames of the first video sequence, wherein the annotation data specifies a phase of the first task performed in an environment to which a video frame to which it is attributed relates;

encoding the second video sequence using the encoder neural network to form, from each second video frame of the sequence of second video frames, a corresponding second encoded video frame; and for at least one first video frame of the sequence of first video frames:

(i) for each of a plurality of the second video frames, determining a respective distance value indicative of a distance between the corresponding first encoded video frame and the corresponding second encoded video frame according to a distance measure;

(ii) determining one of the plurality of second video frames for which the corresponding distance value is lowest;

(iii) associating the first video frame and the determined one of the plurality of second video frames, to associate the corresponding first event with the corresponding second event, the first and second events being events of a same type;

(iv) based on the association of the first event and the second event, associating the annotation data with second video frames of the second video sequence; and (v) using the annotation data associated with the second video frames of the second video sequence as an input to a control program to determine that a first phase of the second task has been completed and to initiate a second phase of the second task.

9. One or more non-transitory computer storage media according to claim 8 in which the operations are performed while the sequence of first video frames of the first video sequence are datasets successively captured by at least one sensor and characterizing a real world environment at successive times.

10. One or more non-transitory computer storage media according to claim 8, wherein using the annotation data associated with the second video frames of the second video sequence as an input to a control program comprises: in response to capturing a video frame of the first video sequence, and associating the first video frame and the determined one of the plurality of second video frames, identifying the annotation data associated with the determined one of the plurality of second video frames, using the annotation data to generate control signals, and based on the control signals, modifying a real world environment.

* * * * *